Figure 1:
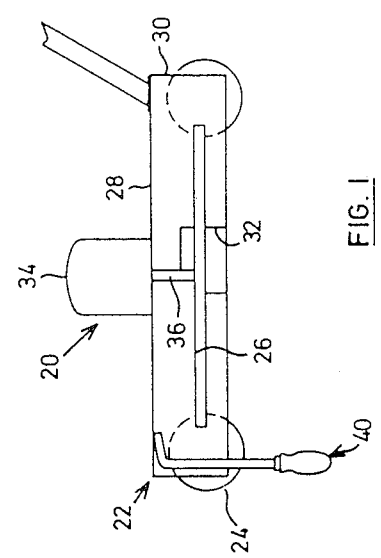

United States Patent [19]

Crook

[11] Patent Number: 4,485,516

[45] Date of Patent: Dec. 4, 1984

[54] LAWN MOWER SCRAPER

[76] Inventor: Philip A. Crook, 44 Sandalwood Ave., Hamilton, Ontario, Canada, L8T 2E3

[21] Appl. No.: 437,223

[22] Filed: Oct. 28, 1982

[51] Int. Cl.³ .............................................. A47L 13/08
[52] U.S. Cl. ..................................... 15/236 R; 15/245
[58] Field of Search ...................... 15/236 R, 245, 111

[56] References Cited

U.S. PATENT DOCUMENTS

| | | | |
|---|---|---|---|
| 428,466 | 5/1890 | Dinsmore | 15/236 R X |
| 745,678 | 12/1903 | Schulze | 15/236 R X |
| 1,700,209 | 1/1929 | Polzon | 15/236 R X |
| 2,539,225 | 1/1951 | Bettencourt | 15/236 R X |
| 2,957,192 | 10/1960 | Faughnder | 15/236 R |
| 3,070,823 | 1/1963 | Heinig | 15/236 R X |
| 4,355,432 | 10/1982 | Storm | 15/236 R X |

FOREIGN PATENT DOCUMENTS

| | | | |
|---|---|---|---|
| 905,207 | 4/1945 | France | 15/236 R |
| 2,415,425 | 9/1979 | France | 15/236 R |
| 568829 | 4/1945 | United Kingdom | 15/236 R |
| 924175 | 4/1963 | United Kingdom | 15/236 R |

Primary Examiner—Chris K. Moore
Attorney, Agent, or Firm—Hirons, Rogers & Scott

[57] ABSTRACT

A scraper for cleaning a lawn mower housing includes an L shaped blade element to conform to the underside of the housing. The blade element has a V shaped cross section to provide a concavity on the surface of the blade element facing the housing. The scraper dislodges debris collected within the housing by simple movement of the scraper around the periphery of the housing.

8 Claims, 4 Drawing Figures

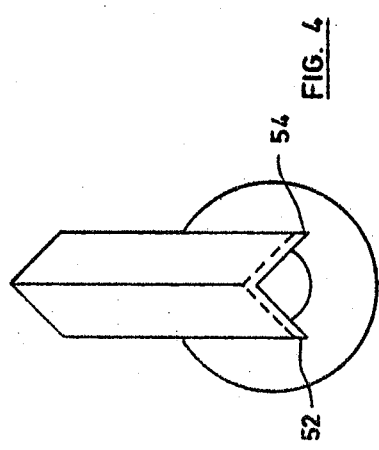

LAWN MOWER SCRAPER

The present invention relates to scrapers for use in clearing accumulated debris from the underside of a mower.

The use of a rotary mower in which a cutting element rotates about a vertical axis within a housing is almost universal within North America. Such mowers usually have a motor supported on a horizontal deck with a skirt extending around the periphery of the deck. The cutting element is located within the skirt below the deck and a discontinuity is provided in the skirt to allow cut material to be expelled from within the housing at one location. The provision of the skirt is necessary to protect the user of the mower and to direct the cut grass to one side of the swath being cut. However, the provision of this enclosed skirt also leads to the accumulation of debris within the housing which impairs the cutting efficiency of the mower. This problem is particularly acute when the grass being cut is damp as the cut material tends to adhere to the underside of the deck. This accumulation of debris not only impairs the cutting efficiency of the mower but also tends to induce corrosion of the deck as moisture is retained within the debris. Moreover, once the debris dries it presents a hard mat that is difficult to dislodge so that even after use in dry conditions the underside of the deck is likely to remain clogged.

It is therefore an object of the present invention to provide a scraper that may be used for clearing the debris beneath the deck in a convenient, simple manner so that maintenance of the mower is facilitated.

According therefore to the present invention there is provided a scraper for use with a mower having a cutting element rotating about a vertical axis within a housing, said scraper comprising a handle, and a blade element extending from said handle, said blade element comprising first and second portions connected to one another and disposed substantially at right angles to one another, said blade element having a pair of opposed edges extending along the length of the blade element for engagement with said housing to remove debris therefrom.

Figure 2:
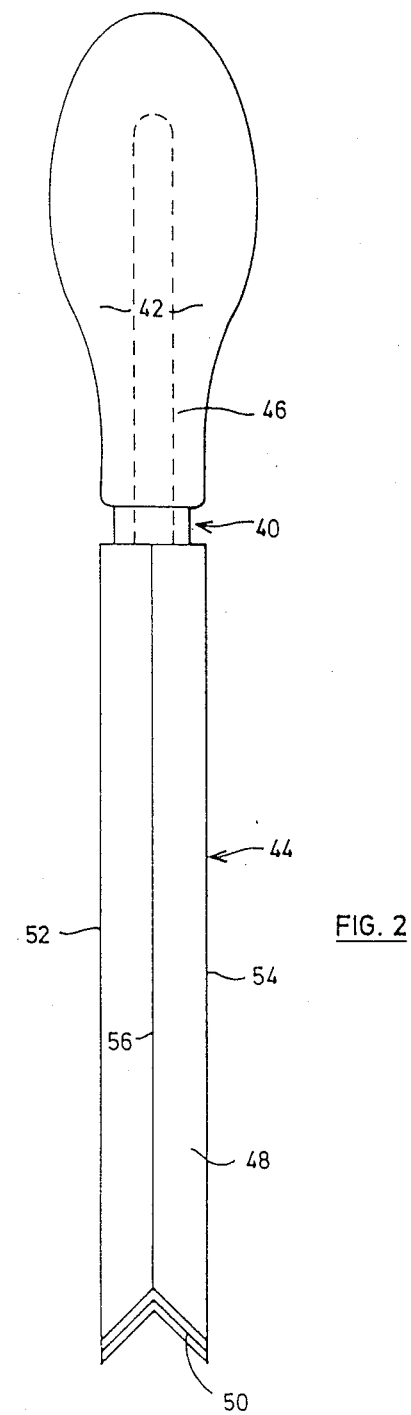
Figure 3:
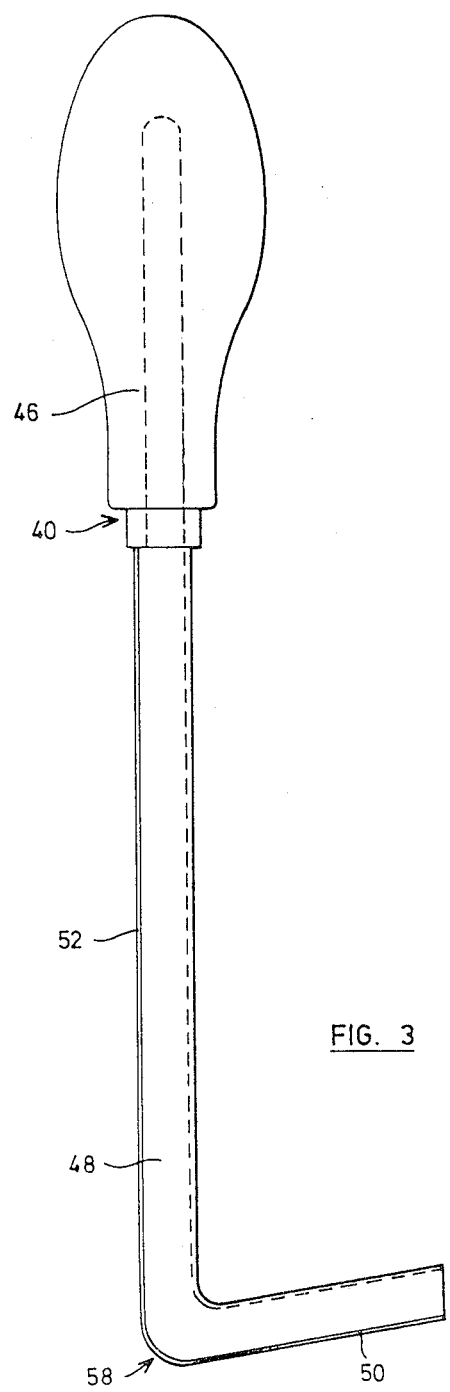

An embodiment of the invention will now be described by way of example only with reference to the accompanying drawings in which FIG. 1 is a diagramatic section of a portion of a mower showing the location of the scraper relative to the mower deck, FIG. 2 is a front elevation of the scraper shown in FIG. 1, FIG. 3 is a side elevation of the scraper shown in FIG. 2, FIG. 4 is an end view of the scraper shown in FIG. 2.

Referring now to the drawings and in particular to FIG. 1, a mower generally designated 20 includes a housing 22 supported on wheels 24 and containing a cutting element 26. The housing 22 includes a deck 28 and a peripheral skirt 30 having an outlet 32 formed therein. Mounted on the deck 28 is a motor 34 having a drive shaft 36 connected to the cutting element 26 to rotate the cutting element about a generally vertical axis. The cutting element 26 extends into close proximity with the skirt 30 to cut grass within the housing and discharge it through the outlet 32.

A scraper 40 is designed to clean the interior of the housing 22 by engaging the skirt 30 and the underside of the deck 28 to remove debris therefrom. The details of the scraper 40 may best be seen in FIGS. 2 through 4. The scraper 40 includes a handle 42 mounted at one end of a blade element 44 by means of a tang 46. The blade element 44 is formed from a strip of material having a pair of longitudinal edges 52, 54. The material of the blade element 44 is bent about an axis generally parallel to the edges 52, 54 to provide a ridge 56 extending along the length of the blade element 44 and provide a V shaped cross section to the blade element made up of two planar portions inclined to one another and intersecting on the longitudinal axis of the blade element.

The blade element 44 is also bent intermediate its ends at a region designated 58 to define two portions 48, 50 of the blade element. The included angle between the portions 48 and 50 is in order of 90° with the preferred angle being 85°. The blade element 44 therefore presents a concavity along the surface of the blade element that is presented to the underside of the housing 22.

The length of the blade portions 48 and 50 will vary according to the mower on which the scraper is to be used. Typically however, the length of the portion 48 will be in the order of 4⅝ inches in the length of the blade portion 50 is typically 3 inches when used on a mower having a single cutting element 26 and would typically be in the order of 1½ inches for a mower having two cutting elements 26. The width of the blade element 44 again can vary but it has been found that a width of one inch is satisfactory with a displacement between the ridge 56 and the edges 52, 54 in the order of 3/16 of an inch. The blade element 44 is typically bent around ⅛ inch radius to avoid undue stress concentration and to conform to the bend at the edge of the deck.

The scraper is used by inserting it beneath the housing 22 with of course the motor 34 stopped. The shape of the scraper allows the inside of the skirt 30 and the underside of the deck 22 to be cleaned at one pass with the shape of the blade element conforming to the underside of the decking. The concavity on the underside of the element 44 presents the edges 52, 54 at an increased angle of attack and thereby enhances the scraping action on the underside of the housing 22. It is therefore a simple matter to insert the scraper 40 into the housing and to move it around the circumference of the skirt 30 to dislodge and debris that may have collected. The blade portion 48 passes between the outer edges of the cutting element 26 and the skirt so that removal of the cutting element 26 is not required. The dislodged material will then fall out and may be removed thereby improving the efficiency of the mower and increasing the life of the housing.

If desirable the cross section of the blade element may be curved or may be planar although the V shape is preferred for ease of manufacture and strength.

The scraper is also useful in mowers provided with a shroud around the drive shaft, as typically occurs with twin bladed movers, for cleaning debris from around the shroud. The scraper can be used in a manner similar to that described above with the portion 48 against the shroud and the portion 50 on the underside of the deck.

The embodiments of the invention in which an exclusive property or privilege is claimed are defined as follows:

1. A scraper for use with a mower having a cutting element rotating about a vertical axis within a housing, said scraper comprising a handle, and a blade element extending from said handle, said blade element comprising first and second portions connected to one another and disposed substantially at right angles to one another, said blade element having a pair of opposed edges extending along the length of the blade element for engagement with said housing to remove debris therefrom with the blade element being concave between said edges to present said edges at an angle to said housing.

2. A blade element according to claim 1 wherein said first and second portions are displaced at an angle of 85° to one another.

3. A scraper for cleaning the underside of a housing of a rotary mower, said scraper comprising a blade element formed from a strip of material and bent intermediate its ends about a transverse axis to define first and second portions extending at substantially 90° relative to one another said strip having a V shaped section on said transverse axis to present a concave surface toward said housing.

4. A scraper according to claim 3 wherein the included angle between said first and second portion is 85°.

5. A scraper for cleaning the underside of a housing of a rotary mower having a deck and a skirt, said scraper comprising a handle, a blade element connected to said handle and having a pair of spaced edges extending along the longitudinal axis of said element, said blade element being bent about a transverse axis intermediate its ends to define a generally L shaped blade with first and second blade portions and having an external surface for presentation to the underside of said housing to overlie both the deck and the skirt, said external surface being concave to present said edges at an angle to said housing.

6. A scraper according to claim 5 wherein said blade element is formed from a strip of material of substantially uniform thickness and a concavity is formed on the outwardly directed surfaces intermediate said edges.

7. A scraper according to claim 6 wherein concavity is defined by a pair of planar surfaces inclined relative to one another and intersecting on the longitudinal axis of said blade element.

8. A scraper according to claim 7 wherein said blade portions are disposed at an included angle of 85°.

* * * * *